July 10, 1945.  O. W. BOYEA  2,379,875
AIRPLANE
Filed Sept. 14, 1943
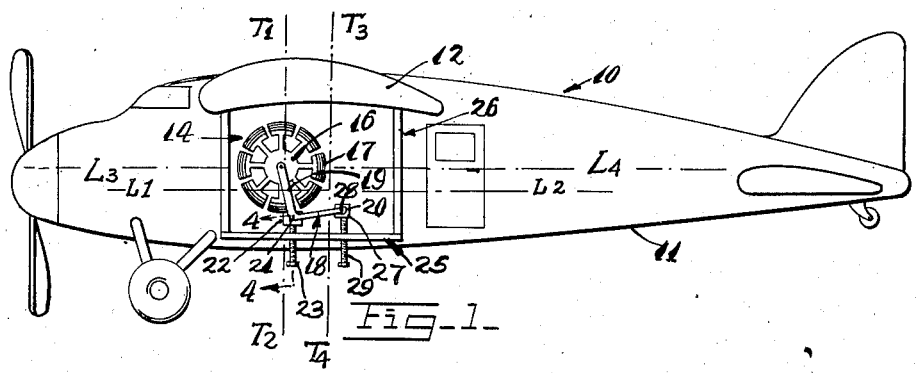
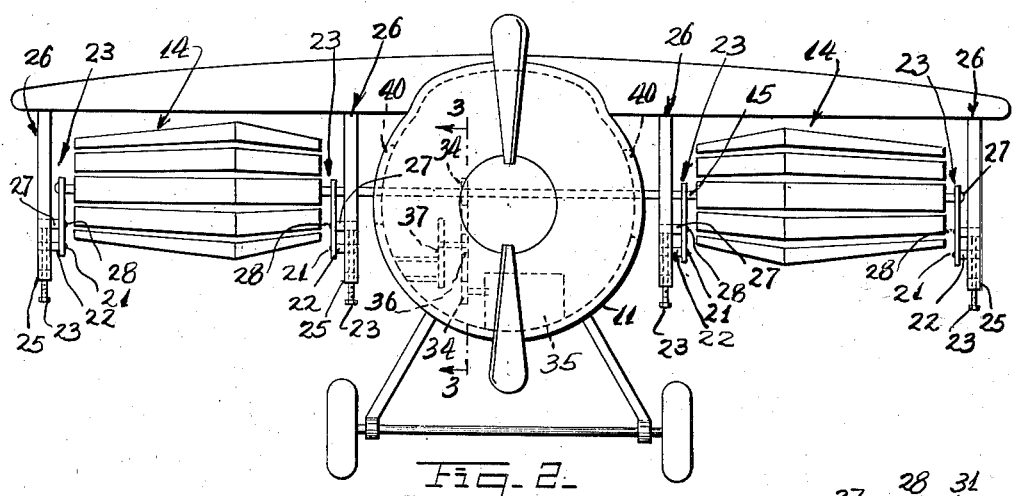
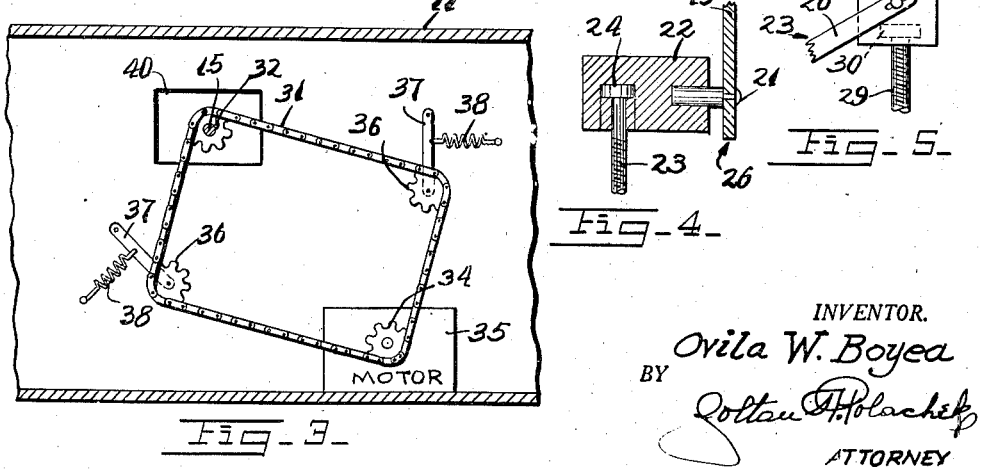
INVENTOR.
Ovila W. Boyea
BY
Zoltan H. Holachek
ATTORNEY Patented July 10, 1945

2,379,875

UNITED STATES PATENT OFFICE 2,379,875

AIRPLANE

Ovila W. Boyea, Malone, N. Y.

Application September 14, 1943, Serial No. 502,251

3 Claims. (Cl. 244—9)

This invention relates to new and useful improvements in an airplane.

More specifically, the invention relates to an airplane having a fuselage with laterally extending wings. It is proposed to provide rotor-like laterally extending auxiliary wings disposed beneath said wings and having their centers located on a horizontal axis through the center of gravity of said airplane.

It is also proposed to provide adjustable means for rotatively supporting said rotor-like auxiliary wings in various positions from said axis and said center of gravity. With this construction it is possible to relocate the rotor-like auxiliary wings to better balance and counter-balance the airplane for different loads on different trips.

The invention also proposes the provision of means for driving said rotor-like auxiliary wings in all their adjusted positions.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevational view of an airplane constructed in accordance with this invention.

Fig. 2 is a front view of Fig. 1.

Fig. 3 is a fragmentary longitudinal sectional view taken on the line 3—3 of Fig. 2.

Fig. 4 is a view taken on the line 4—4 of Fig. 1.

Fig. 5 is a fragmentary enlarged detailed view of a portion of Fig. 1.

The airplane, according to this invention, is used in combination with an airplane 10 of any design and construction having a fuselage 11 and laterally extending wings 12. Rotor-like laterally extending auxiliary wings 14 are disposed beneath said wings 12 and have their centers of rotation coinciding with a shaft 15 located on the horizontal axis through the center of gravity, L3, L4 of said airplane and substantially upon a vertical axis through the center of gravity T1, T2. Each rotor-like rotary wing 14 includes a hub portion 16 supporting a plurality of arcuately arranged blades 17 disposed upon the circumference of a circle. Each rotary-like auxiliary wing 14 is substantially of cylindrical form.

Adjustable means is provided for rotatively supporting said rotor-like auxiliary wings 14 in various positions from said axis L3, L4 and the axis T1, T2 to the axis L1, L2 and T3, T4 as the center of gravity shifts with changes in load. This adjustable means includes several bell cranks 18 having substantially vertically extending arms 19 and horizontally extending arms 20. The vertically extending arms 19 rotatively support the shaft 15 which extends transversely across the airplane between the tip portions of the wings 12. Each bell crank 18 is pivotally supported by a pintle 21 mounted on a block 22 which is supported by an adjustment screw 23. Each adjustment screw 23 has a head 24 rotatively mounted within the block 22. Each adjustment screw 23 is threadedly mounted at the base arm 25 of a frame 26 mounted on the wing 12. These frames 26 are located to the sides of the auxiliary wings 14.

A block 27 is connected to the extremity of each horizontal arm 20 by a pintle 28. Each block 27 is adjustably supported by a vertical screw 29. Each vertical screw 29 is threadedly engaged in the horizontal arm 25 of a frame 26. Each vertical screw 29 has a head 30 rotatively engaging one of said blocks 27. The pins 28 engage slots 31 in the horizontal arms 20 on said bell cranks 18.

The shaft 15 is connected with a transmission by which it may be driven. This transmission includes a gear 32 fixed on said shaft 15 and engaged by an endless chain 33 engaging over a gear 34 on the shaft of a driven engine 35. Several idler gears 36 maintain the tension of the chain 33. These idler gears 36 are mounted on pivotally mounted levers 37 urged outwardly by springs 38. The springs 38 are connected between the levers 37 and the fuselage 11 of the plane. The fuselage 11 is formed with side openings 40 through which said shaft 15 passes.

The operation of the device is as follows:

The rotor-like auxiliary wings 14 are indirectly driven by the engine 35. The airplane may be rebalanced by adjusting the screws 23 for moving the rotor-like auxiliary wings vertically upwards or downwards to relocate said rotor-like auxiliary wings 14 in relation to the axis L3, L4. As illustrated on the drawing the rotary wings 14 are located on an axis L3, L4 positioned above the axis L1, L2. The screws 29 may be adjusted for pivoting the bell cranks 18 for relocating the rotor-like auxiliary wings 14 forwards or rearwards of the axis T1, T2. For example, the auxiliary wings 14 may be relocated on the axis T3, T4.

The application of my improvement to airplanes will reduce the hazard of airplanes crashing while in flight, without deforming the exterior appearance of the plane by increasing the size or span of the wings, merely by the application of propellors of least head surface pressure to the leading edges of the plane's wings. Since these propellors have a full revolving radius they will improve the stability of the plane and its ease of maneuverability by increasing the high diffusion of draft within the immediate area of its wings.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In an airplane having a fuselage with laterally extending wings, rotor-like laterally extending auxiliary wings disposed beneath said wings and having their centers located on a horizontal axis through the center of gravity of said airplane, adjustable means for rotatively supporting said rotor-like auxiliary wings in various positions from said axis, and means for driving said rotor-like auxiliary wings in all of their adjusted positions, said adjustable means for rotatively supporting the said auxiliary wings including bell cranks, means for vertically adjustably supporting said bell cranks, means for pivotally supporting said bell cranks in various pivoted positions, and said bell cranks supporting said rotor-like wings.

2. In an airplane having a fuselage with laterally extending wings, rotor-like laterally extending auxiliary wings disposed beneath said wings and having their centers located on a horizontal axis through the center of gravity of said airplane, adjustable means for rotatively supporting said rotor-like auxiliary wings in various positions from said axis, and means for driving said rotor-like auxiliary wings in all of their adjusted positions, said adjustable means for rotatively supporting the said auxiliary wings including bell cranks, means for vertically adjustably supporting said bell cranks, means for pivotally supporting said bell cranks in various pivoted positions, and said bell cranks supporting said rotor-like wings, said next to the last means, comprising frames supported on the bottom of said wing adjacent the ends of said rotors, and spaced screws vertically threadedly engaged through said frames and having their top ends connected to bell cranks.

3. In an airplane having a fuselage with laterally extending wings, rotor-like laterally extending auxiliary wings disposed beneath said wings and having their centers located on a horizontal axis through the center of gravity of said airplane, adjustable means for rotatively supporting said rotor-like auxiliary wings in various positions from said axis, and means for driving said rotor-like auxiliary wings in all of their adjusted positions, said adjustable means for rotatively supporting the said auxiliary wings including bell cranks, means for vertically adjustably supporting said bell cranks, means for pivotally supporting said bell cranks in various pivoted positions, and said bell cranks supporting said rotor-like wings, said latter means, comprising frames supported on the bottom of said wing adjacent the ends of said rotors, means pivotally supporting said bell cranks on said frames at the junction of their arms, and blocks turnably connected to the extremities of the free arms of said bell cranks, and screws vertically threadedly engaged through said frames and having their ends turnably connected with said blocks.

OVILA W. BOYEA.